(12) United States Patent
Stoltze et al.

(10) Patent No.: US 11,878,752 B2
(45) Date of Patent: Jan. 23, 2024

(54) STEERING SYSTEM AND METHOD AND DEVICE FOR OPERATING A STEERING SYSTEM OF A MOTOR VEHICLE

(71) Applicant: Volkswagen Aktiengesellschaft, Wolfsburg (DE)

(72) Inventors: Lars Stoltze, Lehre (DE); Yevgen Sklyarenko, Braunschweig (DE); Constantin Matthes, Braunschweig (DE); Hendrik Fricke, Liebenburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 332 days.

(21) Appl. No.: 17/342,760

(22) Filed: Jun. 9, 2021

(65) Prior Publication Data

US 2021/0380164 A1 Dec. 9, 2021

(30) Foreign Application Priority Data

Jun. 9, 2020 (DE) .......................... 102020207196.9

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01); *B62D 5/0481* (2013.01)

(58) Field of Classification Search
None
See application file for complete search history.

(56) References Cited

U.S. PATENT DOCUMENTS

| 10,919,568 | B2 | 2/2021 | Schreiner | |
|---|---|---|---|---|
| 2003/0019685 | A1* | 1/2003 | Graber | B62D 5/003 |
| | | | | 180/405 |
| 2021/0276613 | A1* | 9/2021 | Beres | B62D 5/0403 |
| 2023/0013239 | A1* | 1/2023 | Huang | B62D 5/0481 |

FOREIGN PATENT DOCUMENTS

| DE | 102015116937 A1 | 4/2017 |
|---|---|---|
| DE | 102017217100 A1 | 3/2019 |
| DE | 102018114828 B3 | 7/2019 |
| DE | 102018108597 A1 | 9/2019 |
| DE | 102018207466 B3 | 10/2019 |
| EP | 3403904 B1 | 4/2020 |

OTHER PUBLICATIONS

Translation 102017217100 (Year: 2017).*

* cited by examiner

*Primary Examiner* — Jeff A Burke
*Assistant Examiner* — Jerrod Irvin Davis
(74) *Attorney, Agent, or Firm* — Laurence A. Greenberg; Werner H. Stemer; Ralph E. Locher

(57) ABSTRACT

A method for operating a steering system includes providing an electromechanical steering assistance having several redundant control paths. Each control path includes a control unit, a power unit and a winding circuit of a servomotor. A correcting-variable unit is provided in each control unit in order to make a correcting variable available, depending on input variables. The correcting variables of all of the correcting-variable units are averaged. A set correcting variable is made available by each control unit, depending on the averaged correcting variable. A device for operating a steering system and a steering system for steering wheels of a motor vehicle, are also provided.

9 Claims, 3 Drawing Sheets

STEERING SYSTEM AND METHOD AND DEVICE FOR OPERATING A STEERING SYSTEM OF A MOTOR VEHICLE

CROSS-REFERENCE TO RELATED APPLICATION

This application claims the priority, under 35 U.S.C. § 119, of German Patent Application DE 10 2020 207 196.9, filed Jun. 9, 2020; the prior application is herewith incorporated by reference in its entirety.

BACKGROUND OF THE INVENTION

Field of the Invention

The invention relates to motor vehicles, in particular to motor vehicles with automatic steering systems for automatic execution of a steering requirement.

Electromechanical steering systems are used in motor vehicles in order to produce a steering torque or steering force generated by an electric motor. Such steering systems serve, for instance, for carrying out driver-assistance functions such as, for example, a lane-keeping assistance function, undertaking partial tasks in the course of driving maneuvers such as, for example, in the case of a parking assist system, or for adjusting the steering position of the wheels autonomously in a steer-by-wire steering system.

A desired steering requirement is carried out for all of those functions, and a set correcting variable in the form of an appropriate set correcting torque or an appropriate set correcting force is made available. The set correcting variable is frequently made available with the aid of a controller such as, for instance, a steering-position controller or the like.

Since the orderly functioning of the steering system is critical for safety, steering systems are entirely or partially of redundant construction. In particular for steer-by-wire systems, a completely redundant structure is necessary, since as a result of the absent mechanical connection between steering wheel and steered wheels there is no alternative assistance option for the driver in the event of a failure of the steering system.

In principle, two concepts are known for a redundant configuration of the steering control. In the event of failure of one of the control paths, although only a decreased correcting torque is available for a correcting steering movement, a total failure is avoided. In a master/slave concept, the steering system is controlled by a master control path. A redundant slave control path is additionally provided. In the event of failure of the master control path, the slave control path undertakes the activation of a steering servomotor. In the case of a so-called master/master concept, several control paths having equal rights for activating several steering servomotors or for activating one steering servomotor with several separate winding circuits are provided.

German Patent Application DE 10 2018 108 597 A1 discloses a redundant control apparatus for an electromechanical steering system of a motor vehicle, with a primary control path and with a secondary control path. The primary control path includes a primary arithmetic logic unit, a primary driver stage and a primary power module, and the secondary control path includes correspondingly a secondary arithmetic logic unit, a secondary driver stage and a secondary power module. The power modules serve for activating two physically separate electric motors or for activating a single electric motor with two winding groups. By virtue of the two physically separate torque-generators, a moment of rotation can be exerted on the same shaft. In addition, a communication between the two control paths through a signal line is provided directly between the arithmetic logic units.

In the case of the master/master concept for the structure of a steering control apparatus, correcting signals for several winding circuits of one or more steering servomotors are generated so as to have equal rights. By reason of discrepancies between the available independently ascertained input signals, that may result in differing set correcting variables which result in the provision of differing correcting torques or in differing correcting forces in the several winding circuits. Since both set correcting variables are taken into consideration appropriately in the course of the positioning of the steering system, the winding circuits may, where appropriate, also generate correcting forces or correcting torques acting contrary to one another. That holds true, in particular, when the set correcting variable is generated on the basis of a feedback control which, where appropriate, includes an integrator component. Slight control deviations with differing algebraic signs may then accumulate on both control paths and may in that way result in differently directed correcting torques or correcting forces.

BRIEF SUMMARY OF THE INVENTION

It is accordingly an object of the invention to provide an improved steering system and a method and a device for operating a steering system of a motor vehicle, which overcome the hereinafore-mentioned disadvantages of the heretofore-known systems, devices and methods of this general type and which have been constructed with a control according to the master/master concept. In particular, control paths acting contrary to one another are to be avoided.

With the foregoing and other objects in view there is provided, in accordance with the invention, a method for operating a steering system with an electromechanical steering assistance, with several redundant control paths, wherein each control path includes a control unit, a power unit and a winding circuit of a servomotor, wherein a correcting-variable unit is provided in each control unit, in order, depending on input variables, to make a correcting variable available, wherein the correcting variables of all of the correcting-variable units are averaged, and wherein a set correcting variable is made available by each control unit, depending on the averaged correcting variable.

Further configurations are specified in the dependent claims.

In particular, the averaged correcting variables as set correcting variables can each be passed on to the power unit of the control path in question.

In the case of the master/master concept for the control of steering systems, two, or more than two, control paths having equal rights are provided which each include a control unit, for making available a set correcting variable for a power unit for converting the set correcting variable into a corresponding motor activation, and also a winding circuit for generating a correcting torque corresponding to the set correcting variable or for generating a correcting force corresponding to the set correcting variable. The winding circuits may be accommodated in one or more steering servomotors.

As a result of discrepancies of input variables of the control paths having equal rights, such as, for example, as a result of differently measured (that is to say, different time, different sensor) steering positions or steering angles, where appropriate of longitudinal and transverse accelerations (depending upon the control concept), and of the steering-rack position, the control units may generate differing set correcting variables which result in differing correcting torques/forces generated by the winding circuits. In the case of a cascaded controller, discrepancies in the measured steering-displacement speed or steering-angle speed may, in addition, also be relevant.

Depending upon the implemented functional range of the control unit, slight discrepancies of the input variables with differing algebraic signs may accumulate in both control paths, so that set correcting variables with differing algebraic signs may be created. In this case, the sum of the correcting torques is, as a rule, correct and corresponds to the aim of the control function being carried out, but the winding circuits consume an unnecessarily large amount of electrical energy, since the actual correcting torques/forces thereof act contrary to one another. As a result of the excessive thermal loading, the availability and the service life of the components of the control paths can be negatively impacted.

According to the above method, there is therefore provision to make the set correcting variables of the several control paths, which are provided at the output of the respective control units, available to the respective other control path. The control paths then provide for undertaking an averaging of the two set correcting variables in each instance and for utilizing this average for the generation of the respective correcting torque/force.

Consequently, a mutually opposing action of the control paths can be prevented, since the averaging of the two set correcting variables takes place at the level of digital data processing, and not as a result of superimposition of torques or forces.

In particular, the correcting-variable units may each include a feedback control, in particular a steering-position feedback control, with an integrator component, the integrator component being influenced in each instance in a manner depending on the averaged correcting variables. Moreover, the integrator component can be influenced by a difference between the set correcting variable and the actual correcting variable.

In particular, integrator components of the steering-position feedback control may have the consequence that the set correcting variables of the two control paths differ from one another, and in this way differing algebraic signs of the set correcting variables arise. Even slight control deviations with differing algebraic signs are accumulated in both control paths, so that increasing set correcting variables with differing algebraic signs are created.

As a result, the controller dynamics of the feedback control are negatively impacted. By virtue of the consideration of the averaged set correcting variables in the integrator components, the feedback controls implemented in the several control units are mutually restricted and prevent excessive differences between the integrator components and hence an excessive discrepancy of the set correcting variables. The integrator component of the feedback control is reduced by virtue of the influencing of the integrator components by a difference between the averaged set correcting variable and the set correcting variable of each control path. This can reduce or avoid the so-called windup effect of the integrators of the feedback controls.

By virtue of the consideration of the averaged set correcting variable as outputs of the control units, it is possible to counteract a diverging of the set correcting variables, so that no correcting torques or correcting forces acting contrary to one another are brought about by the corresponding winding circuits.

There may be a provision for the difference between the set correcting variable and the correcting variable to be weighted. Due to the provision of a weighted feedback of the difference formed from the output set correcting variable and the averaged set correcting variable in each control path, the influence of the averaging of the set correcting variable on the respective integrator component can be adjusted.

There may be a provision for the integrator component to be controlled in an event-based manner, in order to realize an anti-windup.

This can be realized, for instance, by virtue of the integration being set (frozen) to a suitable value and by the integration being temporarily suspended if one or more of the following criteria are satisfied:

exceeding of a certain discrepancy between the set correcting variables;
falling short of a certain control difference; and
reaching a saturation limit.

After a resetting of the integrator, the latter can be set to a mean value of the integrator components of the two control paths or to a value deviating from the mean value, which is predetermined in order to optimize the dynamics in the saturation behavior.

With the objects of the invention in view, there is also provided a device for operating a steering system with an electromechanical steering assistance with several redundant control paths, wherein each control path includes a control unit, a power unit and a winding circuit of a servomotor, wherein a correcting-variable unit is provided in each control unit, in order, depending on input variables, to make a correcting variable available, wherein the control paths are configured to average the correcting variables of all of the correcting-variable units, and a set correcting variable is made available by each control unit, depending on the averaged correcting variable.

With the objects of the invention in view, there is concomitantly provided a steering system for the steering of wheels of a motor vehicle, with one or more servomotors and/or with one or more winding circuits for bringing about a steering force or a steering torque, and with the above device.

Other features which are considered as characteristic for the invention are set forth in the appended claims.

Although the invention is illustrated and described herein as embodied in a steering system and a method and a device for operating a steering system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
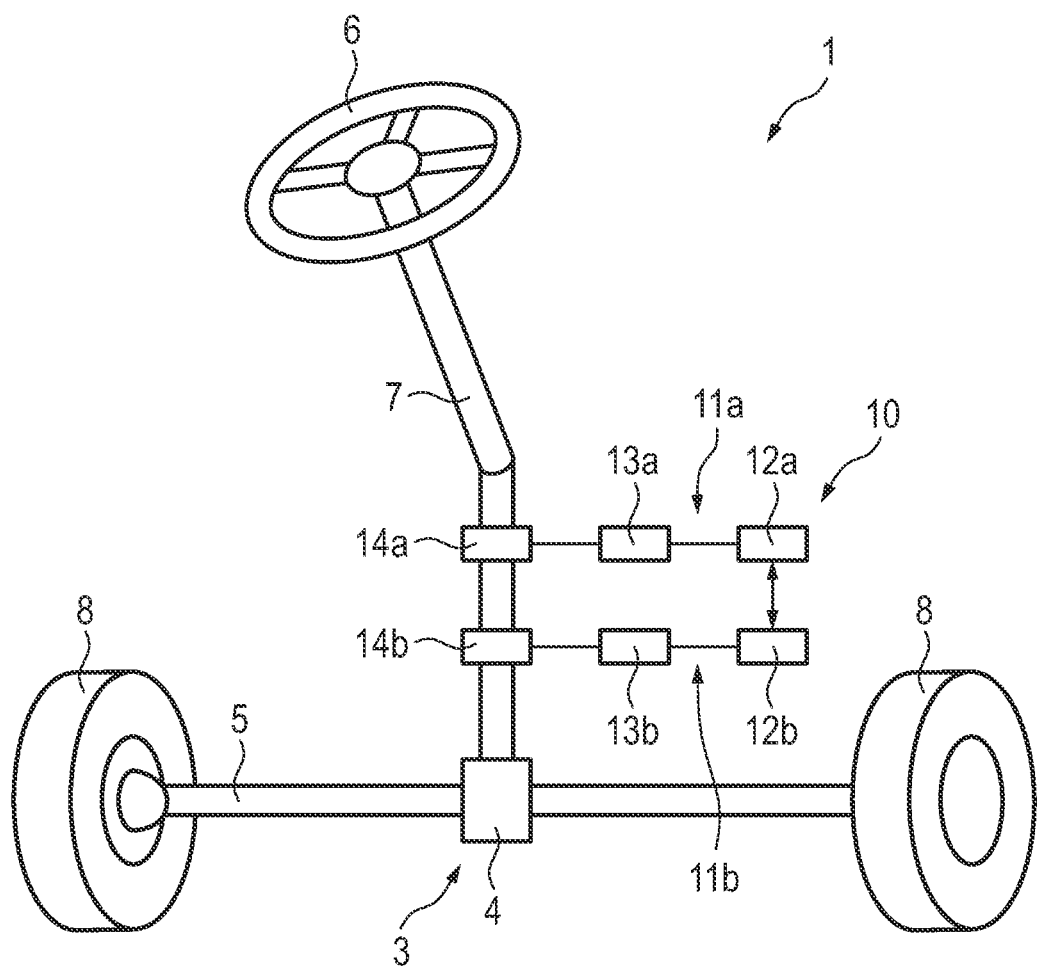
FIG. 1 is a diagrammatic, perspective view of a steering system for a motor vehicle.

Referring now to the figures of the drawings in detail and first, particularly, to FIG. 1 thereof, there is seen a diagrammatic representation of a steering system 1 with an electromechanical steering assistance 10. The steering system 1 includes a steering gear 3 which has a pinion 4 and a steering rack 5, in order to transmit a manual steering torque applied manually—for example, through a steering wheel 6 and a steering rod 7—or a manual steering force to the steering rack 5. The steering rack 5 is coupled with steered wheels 8, in order to steer the latter in accordance with a position of the steering rod 7.

The electromechanical steering assistance 10 of the steering system 1 enables the application of a steering torque or steering force generated by an electric motor for the purpose of steering assistance or for fully automated adjustment of a steering position, particularly in the course of autonomous driving or in the course of an automatic maneuvering procedure.

The steering assistance 10 includes two (as represented in the embodiment shown) or more than two redundant control paths 11a, 11b which respectively include a control unit 12a, 12b, a power unit 13a, 13b and also a winding circuit 14a, 14b, activated by the power unit 13a, 13b, of one or more servomotors. The control units 12a, 12b are in communication with one another.

The winding circuits 14a, 14b may have been provided in separate servomotors or, in each instance, separately in a common servomotor. In the exemplary embodiment shown, two servomotors are acting on the steering rod, in order to apply a correcting torque there. In alternative embodiments, the servomotors can also act directly on the steering rack and can apply a steering force there.

The power units 13a, 13b serve to convert a set correcting variable—as a rule, provided digitally—into electrical activation signals for the winding circuits 14a, 14b, so that the winding circuits make an appropriate steering torque available to the steering rod or make an appropriate steering force available to the steering rack.

Figure 2:
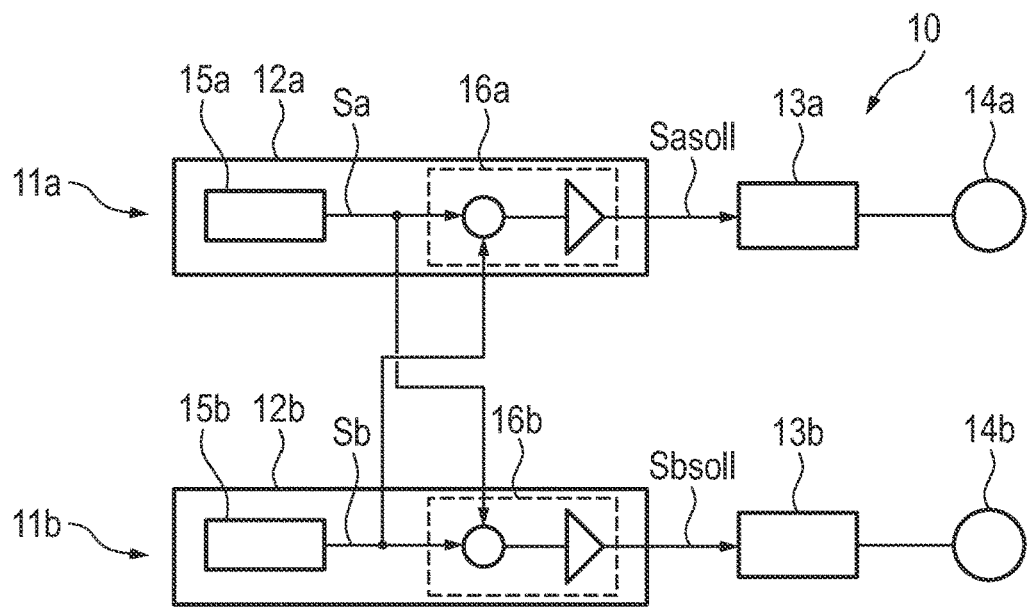
FIG. 2 is a block diagram showing a control system with two control paths for making a correcting steering torque available.

In FIG. 2 an embodiment of the steering assistance 10 of FIG. 1 is represented schematically in an exemplary manner. A first control path 11a can be discerned, with the first control unit 12a, with the first power unit 13a and with the first winding circuit 14a of a servomotor. A second control path 11b can be discerned, with a second control unit 12b, with the second power unit 13b and with the second winding circuit 14b of the common servomotor or of a separate servomotor.

The first and second control units 12a, 12b respectively make available a set correcting variable Sasoll, Sbsoll for the power unit 13a, 13b in question, which represent a set correcting force and a set correcting torque, respectively.

In the exemplary embodiment shown, the control units 12a, 12b include a first and a second correcting-variable unit 15a, 15b, respectively, which generate a correcting variable Sa, Sb, depending upon which the power units 13a, 13b are activated.

The correcting variables Sa, Sb are now averaged in an averaging element 16a, 16b averaging the respectively provided first correcting variable Sa with the second correcting variable Sb of the correcting-variable unit 15a, 15b. The averaged correcting variables are now supplied, as a respective set correcting variable Sasoll, Sbsoll, to the corresponding power unit 13a, 13b. This makes it possible to reduce systematic discrepancies between the set correcting variables Sasoll, Sbsoll, and in particular to prevent the correcting variables Sa, Sb from resulting in opposed creation of correcting forces or correcting torques in the winding circuits 14a, 14b by reason of accumulating slight discrepancies in the correcting-variable units 15a, 15b. In particular, an excessive heating of the power units 13a, 13b and of the winding circuits 14a, 14b is avoided in this way, since the averaging of the correcting variables Sa, Sb takes place at the software level, and not as a result of superimposition of torques or forces.

Figure 3:
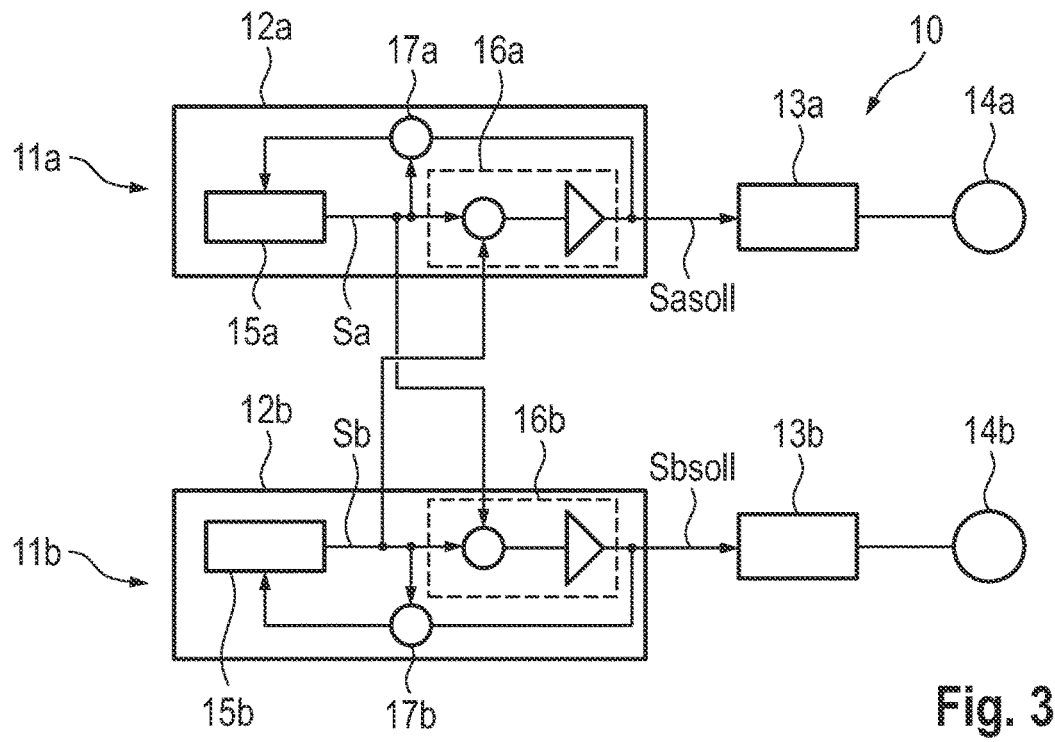
FIG. 3 is a block diagram showing a steering control system according to a further embodiment with consideration of the correcting-variable difference in the correcting-variable unit.

A further embodiment of the steering assistance 10 is represented in FIG. 3. Steering-position feedback controls which include at least one integrator have been respectively implemented therein in the correcting-variable units 15a, 15b. In this case, the steering-position feedback controls may include a PI controller or PID controller and may regulate to a predetermined set steering position. Other forms of feedback-control structures with an integrator component are also applicable.

In this connection, the averaged correcting variables are respectively supplied to a difference element 17a, 17b, in order to compute a difference of the averaged correcting variable from the respective correcting variable Sa, Sb generated by the respective correcting-variable unit 15a, 15b, and to supply this correcting-variable difference to the integrator of the feedback control implemented in the correcting-variable unit 15a, 15b, or to take it into consideration therein. To this end, the averaged correcting variables Sa, Sb and the averaged correcting variables of each control path are subtracted from one another and applied to the integrator component. In this way, the integrator component can be applied to a feedback control being carried out in the respective correcting-variable unit 15a, 15b merely with a discrepancy from the respective difference element 17a, 17b. This makes it possible to compensate the integrator component in accordance with the difference resulting from the discrepancy of the two set correcting variables Sasoll, Sbsoll output by the control units. As a result, a windup of the integrator component is prevented effectively.

There may be provision that the integrator component is controlled in an event-based manner, in order to realize an anti-windup. To this end, the integration can be set (frozen) to a suitable value, and the integration can be temporarily suspended if one or more of the following criteria are satisfied:

exceeding of a certain discrepancy between the set correcting variables;
falling short of a certain control difference and
reaching a saturation limit.

After a resetting of the integrator, the latter can be set to a mean value of the integrator components of the two control paths or to a value deviating from this mean value, which is predetermined in order to optimize the dynamics in the saturation behavior.

Moreover, by virtue of this variant, on one hand the integrator components are prevented from diverging, and a residual discrepancy arises which, for example, results from the proportional components of the steering-position feedback control; on the other hand, by virtue of the averaging, the set correcting variables can be reduced.

Where appropriate, the difference of the averaged correcting variable from the respective correcting variable Sa, Sb actually generated by the respective correcting-variable unit 15a, 15b can be provided with a weighting, in order in this way to be able to adjust the influence on the integrator component.

Figure 4:
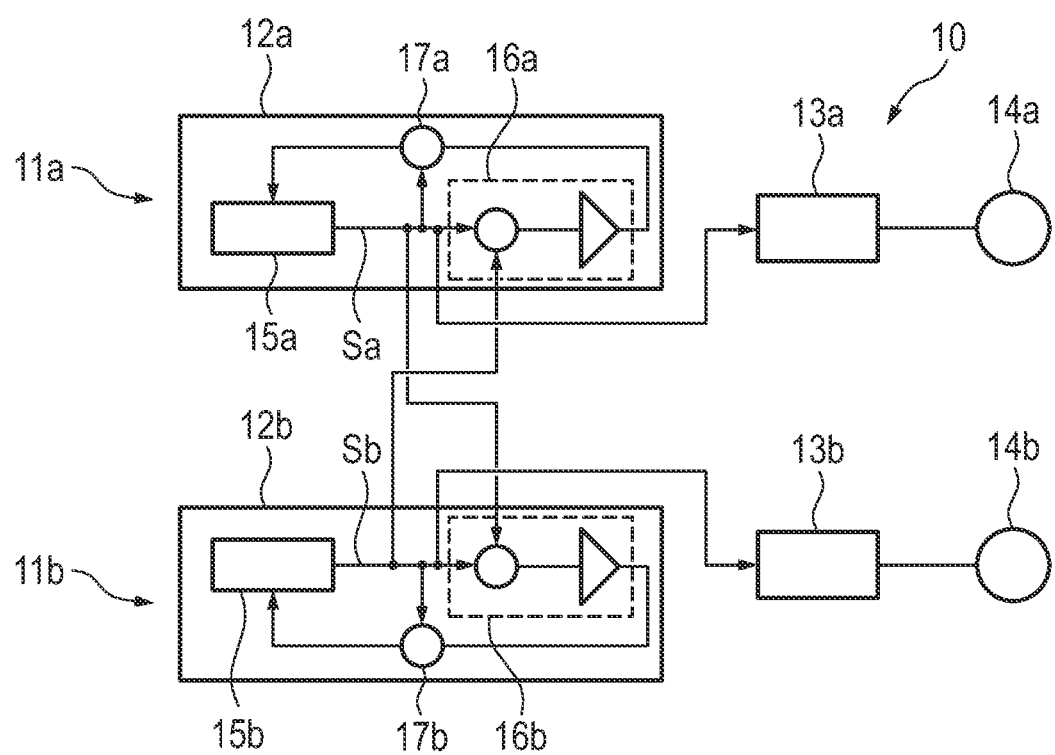
FIG. 4 is a block diagram showing a steering control system according to a further embodiment with consideration of the correcting-variable difference in the correcting-variable unit and with modified tapping of the correcting variable.

Alternatively, as represented in the steering assistance 10 of the block diagram of FIG. 4, the correcting variables Sa, Sb output directly by the respective control units 12a, 12b can be used for activating the power units 13a, 13b, since this output is based directly on the output of the feedback control, taking the integrator component of the steering-position feedback control into consideration. Accordingly, it is not the averaged correcting variables that are used for activating the power units 13a, 13b, but rather the correcting variables Sa, Sb directly, which compute the integrator component, as described above, on the basis of the averaged correcting variable. This reduces the transit-time within the feedback-control circuit of the respective control unit, since the averaging corresponds to a type of filtering.

The following is a summary list of reference numerals and the corresponding structure used in the above description of the invention:

LIST OF REFERENCE SYMBOLS 1 steering system
3 steering gear
4 pinion
5 steering rack
6 steering wheel
7 steering rod
8 steered wheels
10 electromechanical steering assistance
11a, 11b first and second control paths
12a, 12b first and second control units
13a, 13b first and second power units
14a, 14b winding circuits
15a, 15b first and second correcting-variable units
16a, 16b averaging elements
17a, 17b difference elements
Sasoll, Sbsoll set correcting variables
Sa, Sb correcting variables

The invention claimed is:

1. A method for operating a steering system, the method comprising:
providing an electromechanical steering assistance having a plurality of redundant control paths, each control path including a control unit, a power unit and a winding circuit of a servomotor;
using a correcting-variable unit in each control unit to make a correcting variable available in dependence on input variables;
averaging the correcting variables of all of the correcting-variable units;
using each control unit to make a set correcting variable available in dependence on the averaged correcting variable; and
applying correcting torque or forces with the winding circuit of each control path in dependence on the set correcting variable made available by its respective control unit.

2. The method according to claim 1, which further comprises passing on the averaged correcting variables as set correcting variables to the power unit of each respective control path.

3. A method for operating a steering system, the method comprising:
providing an electromechanical steering assistance having a plurality of redundant control paths, each control path including a control unit, a power unit and a winding circuit of a servomotor;
using a correcting-variable unit in each control unit to make a correcting variable available in dependence on input variables;
averaging the correcting variables of all of the correcting-variable units;
using each control unit to make a set correcting variable available in dependence on the averaged correcting variable;
applying a correcting torque or force on the basis of the available set correcting variable; and
providing each of the correcting-variable units with a feedback control having at least one integrator component, and influencing each of the integrator components in dependence on the averaged correcting variables.

4. The method according to claim 3, which further comprises providing the feedback control as a steering-position feedback control.

5. The method according to claim 3, which further comprises influencing the integrator component with a difference between the set correcting variable and the correcting variable.

6. The method according to claim 5, which further comprises weighting the difference between the set correcting variable and the correcting variable.

7. The method according to claim 3, which further comprises controlling the integrator component in an event-based manner, in order to realize an anti-windup.

8. A steering system for steering wheels of a motor vehicle, the steering system comprising:
a servomotor for bringing about a steering force or a steering torque; and
a device according to claim 7.

9. A device for operating a steering system, the device comprising:
an electromechanical steering assistance having a plurality of redundant control paths, each of said control paths including a control unit, a power unit and a winding circuit of a servomotor;
each of said control units having a respective correcting-variable unit for making a correcting variable available in dependence on input variables;
said control paths configured to average the correcting variables of all of said correcting-variable units;
each of said control units making a set correcting variable available in dependence on the averaged correcting variable: and
said electromechanical steering assistance configured to apply correcting torque or forces with the winding circuit of each of said control paths in dependence on the set correcting variable made available by its respective control unit.

* * * * *